US006655585B2

(12) United States Patent
Shinn (10) Patent No.: US 6,655,585 B2
(45) Date of Patent: Dec. 2, 2003

(54) SYSTEM AND METHOD OF BIOMETRIC SMART CARD USER AUTHENTICATION

(75) Inventor: Philip C. Shinn, Los Angeles, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/309,159

(22) Filed: May 10, 1999

(65) Prior Publication Data

US 2001/0048025 A1 Dec. 6, 2001

Related U.S. Application Data

(60) Provisional application No. 60/084,922, filed on May 11, 1998.

(51) Int. Cl.$^7$ ................................................ G06K 5/00
(52) U.S. Cl. ....................................... 235/382; 235/451
(58) Field of Search ............................... 235/492, 382, 235/375–381, 382.5, 383–386; 382/100, 115–127

(56) References Cited

U.S. PATENT DOCUMENTS

| | | | | |
|---|---|---|---|---|
| 4,930,129 A | * | 5/1990 | Takahira | 714/766 |
| 5,111,512 A | | 5/1992 | Fan et al. | 382/3 |
| 5,229,764 A | * | 7/1993 | Matchett et al. | 340/825.34 |
| 5,386,104 A | * | 1/1995 | Sime | 235/379 |
| 5,485,519 A | * | 1/1996 | Weiss | 713/185 |
| 5,764,789 A | * | 6/1998 | Pare, Jr. et al. | 382/115 |
| 5,790,668 A | * | 8/1998 | Tomko | 713/186 |
| 5,862,246 A | * | 1/1999 | Colbert | 382/115 |
| 5,869,822 A | * | 2/1999 | Meadows et al. | 235/380 |
| 5,920,642 A | * | 7/1999 | Merjanian | 382/126 |
| 5,935,071 A | * | 8/1999 | Schneider et al. | 600/445 |
| 5,987,155 A | * | 11/1999 | Dunn et al. | 382/115 |

(List continued on next page.)

FOREIGN PATENT DOCUMENTS

| | | | |
|---|---|---|---|
| EP | 0 612 035 A1 | 2/1993 | ............ G06K/9/00 |
| GB | 2 237 672 A | 5/1991 | ........... A61B/5/117 |
| GB | 2 248 513 A | 9/1991 | ........... A61B/5/117 |
| WO | WO 91/07729 | 5/1991 | |
| WO | WO 96/13800 | 5/1996 | |

OTHER PUBLICATIONS

European Search Report dated Aug. 20, 1999 by Examiner N. Geffen for application No. EP 99 20 1446.

IBM Technical Disclosure Bulletin, vol. 39, No. 06, Jun. 1996, "Identification and Verification of Signatures".

L. L. Lee et al.: Reliable On–Line Human Signature Verification System for Point–of–Sales Applications, Publication Date: Sep. 10, 1994.

*Primary Examiner*—Karl D. Frech
*Assistant Examiner*—Jamara A. Franklin
(74) *Attorney, Agent, or Firm*—George T. Marcou; Kilpatrick Stockton LLP (57) ABSTRACT

A system and method for authenticating a smart card user at a reader device makes use of an application on a smart card microprocessor on which information fields relating to biometric information for the user and a table of pre-defined probability of occurrence values for user authentication is stored. The smart card and a biometric sample for the user is presented to the reader device, and an application associated with the reader device automatically authenticates the user based on a match level between the stored biometric information and the presented biometric sample according to a desired probability of occurrence value from the stored table. Alternatively, the user is automatically authenticated by an application on the smart card microprocessor. The reader device reads the presented biometric sample, automatically presents what is read to the smart card application, and the smart card application then authenticates the user according to the threshold match score from the stored table that corresponds to the desired probability of occurrence value.

38 Claims, 8 Drawing Sheets

U.S. PATENT DOCUMENTS

| | | | | |
|---|---|---|---|---|
| 5,999,637 A | * | 12/1999 | Toyoda et al. | 382/124 |
| 6,070,141 A | * | 5/2000 | Houvener et al. | 705/1 |
| 6,072,891 A | * | 6/2000 | Hamid et al. | 382/116 |
| 6,076,164 A | * | 6/2000 | Tanaka et al. | 713/185 |
| 6,084,968 A | * | 7/2000 | Kennedy et al. | 380/259 |
| 6,104,922 A | * | 8/2000 | Baumann | 455/410 |
| 6,547,130 B1 | * | 4/2003 | Shen | 235/380 |

* cited by examiner

| PROBABILITY | FA | FR |
|---|---|---|
| 1/100 | 200 | 700 |
| 1/1000 | 300 | 600 |
| 1/10,000 | 400 | 500 |
| 1/100,000 | 500 | 400 |

SYSTEM AND METHOD OF BIOMETRIC SMART CARD USER AUTHENTICATION

CROSS REFERENCE TO RELATED APPLICATIONS

This application claims the benefit of U.S. Provisional Patent Application Ser. No. 60/084,922 filed May 11, 1998.

FIELD OF THE INVENTION

The present invention relates to smart card security and more particularly to a system and method of biometric authentication of a smart card user.

BACKGROUND

Authentication is the process by which an entity, such as a financial institution or bank or other type of institution, identifies and verifies its customers or users to itself and itself to its customers or users. Authentication includes the use of physical objects, such as cards and/or keys, shared secrets, such as personal identification numbers (PIN's) and/or passwords, and biometric technologies, such as voice prints, photos, signatures and/or fingerprints. Biometric tasks include, for example, an identification task and a verification task. The verification task determines whether or not the individual claiming an identity is the individual whose identity is being claimed. The identification task determines whether the biometric signal, such as a fingerprint, matches that of someone already enrolled in the system.

Typically, biometric systems have a common methodology, regardless of their modality, such as fingerprint, face, voice, or the like. A person enrolls by donating some number of samples of the biometric. From these samples, the biometric system creates a model of the particular individual's patterns, which is referred to as a template. When the person attempts to access the system, the application collects new data. In a verification application, the individual claims an identity, and the application retrieves the individual's model from a database and compares the new signal to the retrieved model. The result of this comparison is a match score, which indicates how well the new signal matches the template. The application then compares the match score obtained with a pre-defined threshold and decides whether to allow or deny access to the individual or, for example, to ask the individual for more data.

Various authentication parameters are used by security systems to verify a valid cardholder and to grant the cardholder access to a secured resource. Information parameters, such as PIN's, can be readily read and processed by a card reader according to a system verification algorithm. However, information can be compromised, so that many authentication systems also require person-unique biometric parameters, such as fingerprints, or retinal images. In such authentication systems, cardholder bio-specimens are stored in digital format in the system computer. During authentication the system obtains the information parameters, for example, from the card, and the biometric parameters from the person and matches both to the system-stored values. For a fingerprint, for example, there are fourteen points and interpoint distances that the biometric reader compares and, depending on the match score, grants or denies access.

The required match score is a function of a pre-selected security level and is set by the application designer. However, the image acquisition tolerances, as well as changes in the person's biometric parameter, such as a finger cut on the referenced fingerprint, cause false acceptances, such as accepting an impostor (False Accept or FA), and false rejections, such as rejecting a valid user (False Reject or FR). Manufacturers of biometric readers or application developers provide performance histograms, which are distributions of the empirical number of valid acceptances and valid rejections provided by the reader. To the extent the distributions overlap, there are regions of false rejections of valid users or FR and false acceptance of impostors or FA. In setting the system parameters, application designers attempt to set a threshold authentication match score which balances these tolerances against efficiency for a given application.

The selected threshold match score is based on the desired probability of occurrence or non-occurrence of a FA and/or FR, and the performance histograms quantify the probability of occurrence of FA and FR. These probabilities are inverse, in that by increasing the threshold score to reduce the Probability of FA or P(FA), the Probability of FR or P(FR) is increased. Conversely, decreasing the threshold to reduce the Probability of FR or P(FR) increases the Probability of FA or P(FA).

In a given application the selected threshold is coded into the reader software, and system performance is observed. If actual system efficiency is unacceptable due to a False Reject Rate (FRR) that is too high, the threshold score is reduced, and if unacceptable due to a False Accept Rate (FAR) that is too high, the threshold is increased. Each time the threshold score changes, it must be re-coded into the reader system software. Similarly, with each new reader model or new release, the threshold score must be changed in accordance with the new model histograms and possibly changed again following actual performance evaluation. Each re-coding of the threshold value generally requires a new system software release, together with the time and labor required to install the new software.

SUMMARY OF THE INVENTION

It is a feature and advantage of the present invention to provide a system and method of biometric smart card user authentication which automatically adjusts the probability of occurrence or non-occurrence of false acceptance of an impostor and false rejection of a valid user without the necessity of reprogramming the reader system software.

It is a further feature and advantage of the present invention to provide a system and method of biometric smart card user authentication in which the performance of the biometric technology is independent of where the system positions the threshold for false acceptance and false rejection.

It is another feature and advantage of the present invention to provide a system and method of biometric smart card user authentication which makes the card application more secure, thereby reducing the risk of fraudulent or unauthorized use and allowing for higher-value applications It is an additional feature and advantage of the present invention to provide a system and method of biometric smart card user authentication which simplifies application design requirements by putting the user's biometric template on the card, thereby eliminating or greatly reducing network traffic.

It is still another feature and advantage of the present invention to provide a system and method of biometric smart card user authentication which enhances security and privacy by eliminating the necessity of transmitting the user's biometric template around to different locations where it is needed.

It is a still further feature and advantage of the present invention to provide a system and method of biometric smart card user authentication which allows application designers to set operating thresholds as tightly or as loosely as is appropriate for the particular risk involved.

It is also a feature and advantage of the present invention to provide a system and method of biometric smart card user authentication with a flexible architecture format for storing biometrics on the smart card that is independent of application or biometric methodology or vendor.

It is still an additional feature and advantage of the present invention to provide a system and method of biometric smart card user authentication which supports different methods, vendors, and releases, and allows for flexibility of application deployment.

It is another feature and advantage of the present invention to provide a system and method of biometric smart card user authentication in which the user is automatically authenticated by an application on the smart card.

It is an additional feature and advantage of the present invention to provide a method and system of biometric smart card user authentication in which the customer's use of the smart card in a transaction ties the customer undeniably to the transaction and makes the transaction non-reputiatable.

To achieve the stated and other features, advantages and objects of the present invention, the system and method for authenticating a smart card user at a reader device of an embodiment of the present invention includes storing information fields for the user on the smart card relating to biometric information for the user, also referred to as a biometric template. The biometric template includes at least one model of biometric patterns for the user, such as the user's voice print, photograph, signature, fingerprint, hand geometry, retinal image or iris scan. The information fields also include a table of pre-defined probability of occurrence values for user authentication, as well as personal data for the user, identification of a biometric system, and a hashed data field. The information fields are stored in an application on a microprocessor of the smart card.

In an embodiment of the present invention, storing the information fields relating to the table of pre-defined probability of occurrence values involves automatically assigning a probability of occurrence value to each of a plurality of pre-defined range limit values, which are automatically identified for each of a plurality of value ranges of biometric reader device match scores. Identifying the range limit values involves automatically tabulating a performance histogram distribution of biometric reader device match scores for false acceptance of an impostor and false rejection of a valid user into a plurality of value ranges. Tabulating the performance histogram distribution involves automatically quantifying the performance histogram into discrete levels of biometric reader device match scores and automatically assigning the probability of occurrence value for each of the discrete levels of the biometric reader device match scores.

In an embodiment of the present invention, the smart card, together with a biometric sample for the user, are presented to the reader device, which is associated with a terminal, such as at least one of an area access terminal, a computer network terminal, a computer access terminal, a stored value terminal, a monetary access terminal, a PBX terminal, a long distance terminal, a personal computer, a laptop computer, a personal digital assistant, a public internet terminal, and an automated teller machine. The presented biometric sample is, for example, at least one of a voice print, photograph, signature, fingerprint, hand geometry, retinal image, and an iris scan.

In an embodiment of the present invention, the user is automatically authenticated by the reader device based at least in part on a match level between the stored biometric information and the presented biometric sample according to a desired probability of occurrence value from the stored table. The desired probability of occurrence value is pre-selected by pre-defining a desired probability of occurrence value for false acceptance of an impostor and false rejection of a valid user and pre-defining an instruction set which directs the reader device to look to the stored table of probability of occurrence values for a false acceptance of an impostor and false rejection of a valid user threshold match score corresponding to the desired probability of occurrence value. The user authentication is performed by an application associated with the reader device and residing on the reader device and/or the terminal.

Alternatively, in an embodiment of the present invention, in order to provide enhanced security, the user is automatically authenticated by an application on the smart card. For example, the reader device reads the presented biometric sample and automatically presents what is read by the reader device to the smart card application. The smart card application then authenticates the user according to the threshold match score from the table on the smart card application that corresponds to the desired probability of occurrence value.

Additional objects, advantages and novel features of the present invention will be set forth in part in the description which follows, and in part will become more apparent to those skilled in the art upon examination of the following or may be learned by practice of the invention.

DETAILED DESCRIPTION

Figure 1:
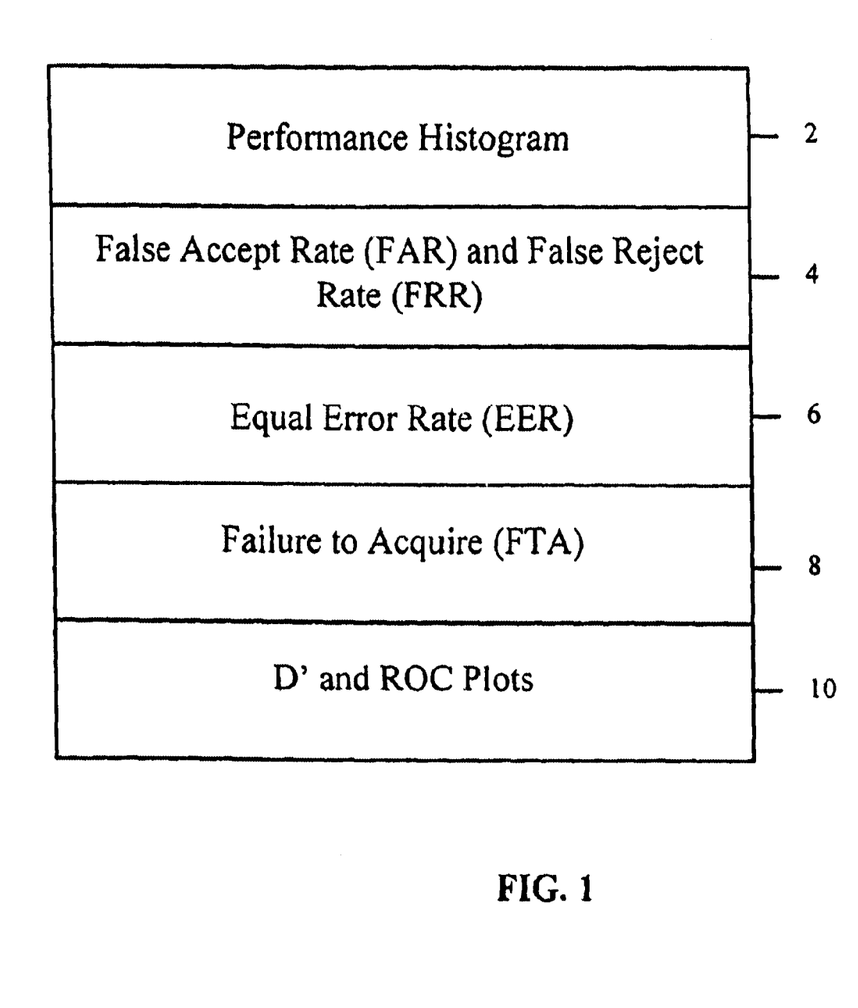
FIG. 1 is a table which illustrates examples of types of data used in measuring biometrics performance for an embodiment of the present invention.

Referring now in detail to an embodiment of the present invention, an example of which is illustrated in the accompanying drawings, a number of methods can be used to quantitatively measure biometrics performance. FIG. 1 is a table which illustrates examples of types of data used in measuring biometrics performance for an embodiment of the present invention. The types of data include, for example, performance histogram 2, False Accept Rate (FAR) and False Reject Rate (FRR) 4, Equal Error Rate (EER) 6, Failure to Acquire (FTA) 8, and "d"' and Receiver Operating Characteristic (ROC) plots 10.

Figure 2:
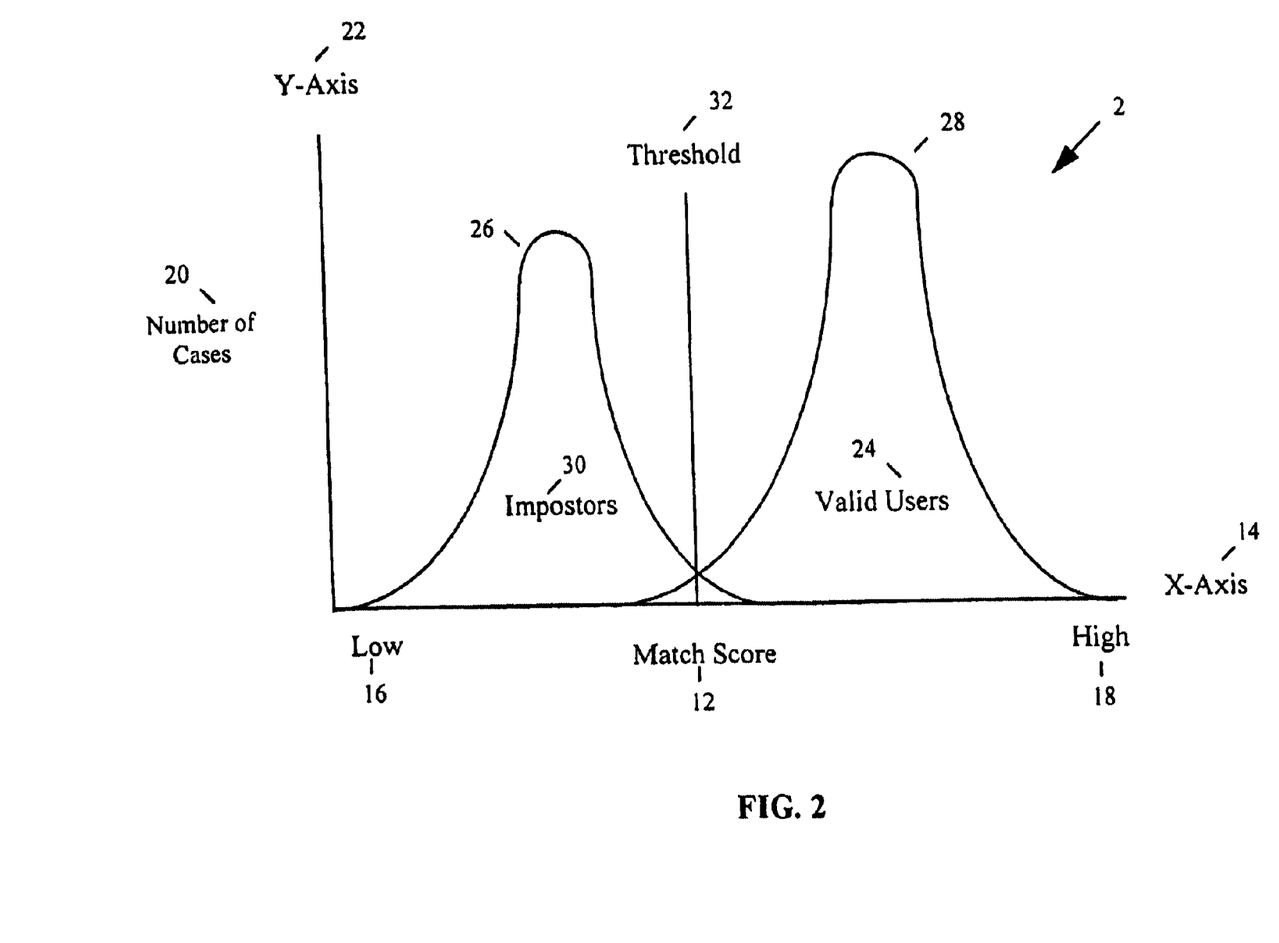
FIG. 2 shows a sample biometric reader device performance histogram for an embodiment of the present invention.

A basic way to look at data for quantitatively measuring the performance of biometrics is to inspect the performance histogram 2. Each time a trial is performed, the system returns a match score which is plotted in the histogram 2. FIG. 2 illustrates a sample biometric reader device performance histogram for an embodiment of the present invention. The histogram 2 has the match score 12 on the x-axis 14, from low scores 16 toward the left side of the histogram to high scores 18 toward the right side of the histogram. The number of cases attempted 20 is shown on the y-axis 22 of the histogram 2. Valid users 24 have higher match scores 18 and are shown on the right side of the histogram 2. Distributions vary from device to device, but are commonly normally distributed as bell curves 26 and 28. Impostors 30 have lower scores 16 and are shown on the left side of the histogram 2. Note also that there are usually fewer impostors 30 than valid users 24.

Figure 3:
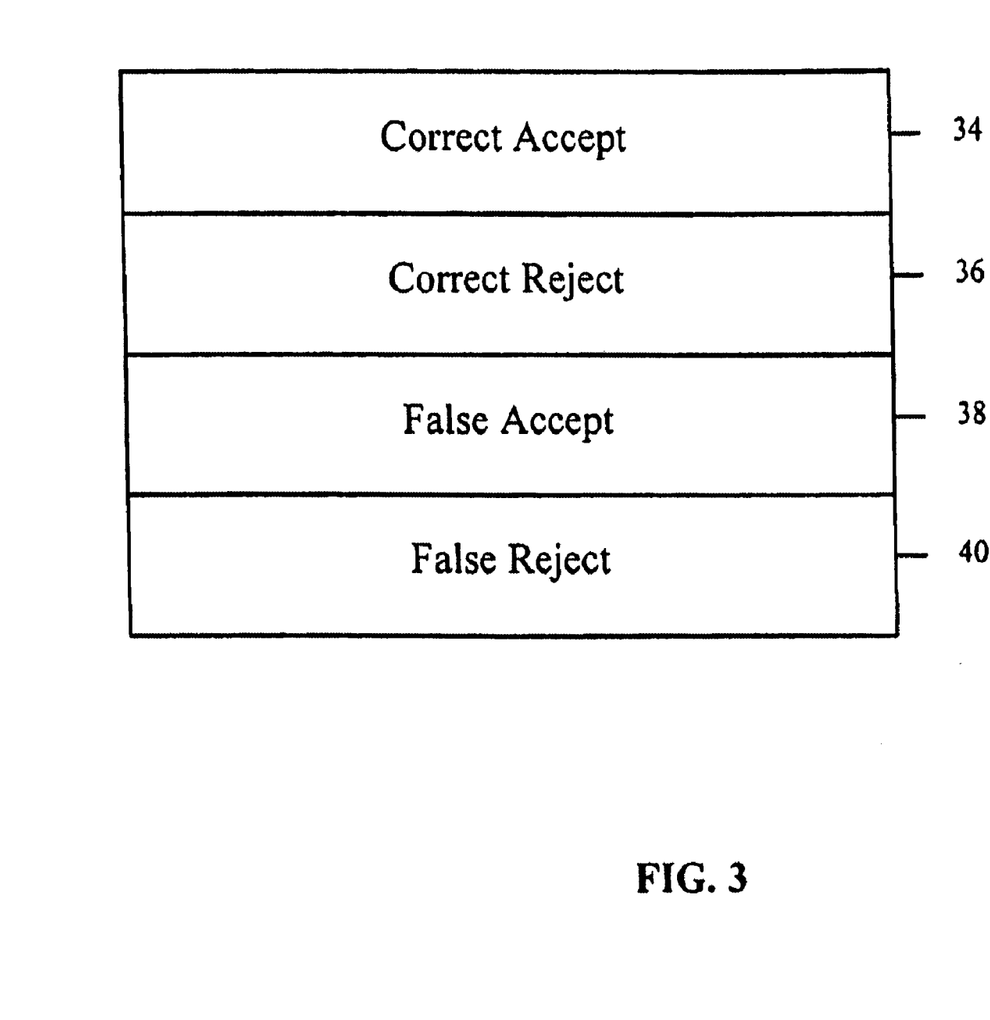
FIG. 3 is a table which illustrates four possible outcomes of a single biometric reader device trial for an embodiment of the present invention.

Referring further to FIG. 2, the vertical line on the histogram, which separates the two distributions of scores 26, 28, is known as the threshold 32. If a user scores higher than the threshold 32, the user is accepted, but if the user scores lower than the threshold, the user is rejected. There are four possible outcomes of a single trial. FIG. 3 is a table with illustrates the four possible outcomes of a single biometric reader device trial for an embodiment of the present invention. The four possible outcomes include, for example, Correct Accept 34 of a customer, Correct Reject 36 of an impostor, False Accept or FA 38 of an impostor, and False Reject or FR 40 of a customer. The percentage of cases in the False Accept or FA 38 outcome is called the False Accept Rate (FAR), and the percentage of cases in the False Reject or FR 40 outcome is called the False Reject Rate (FRR).

Referring again to FIG. 2, if the threshold 32 is repositioned toward the left side of the histogram 2, fewer FR's 40 occur, but more FA's 38 occur. If the threshold 32 is repositioned toward the right side of the histogram 2, more FR's 40 occur, but fewer FA's 38 occur. This is the essential tradeoff made in the context of an application for an embodiment of the present invention. An important aspect of an embodiment of the present invention is that the system and method of the present invention automatically moves the threshold, and the performance of the biometric technology is independent of where the application positions the threshold 32.

The system and method for an embodiment of the present invention moves the threshold 32 according to the objectives of greater security or rejecting fewer customers. Referring likewise to FIG. 2, if the objective is greater security, the threshold 32 is moved to a higher position. If the objective is to reject fewer customers, the threshold 32 is moved to a lower position. Therefore, comparing a system which has, for example, a stated performance level of 1 percent FAR and 10 percent FRR with another system that has, for example, a performance level of 2 percent FAR and 8 percent FRR is analogous to comparing apples with oranges.

Different organizational constituencies typically have different perspectives of the FRR and FAR. For example, a security professional may prefer to know what the FRR will be if the FAR is set to 0 percent, while a marketing professional may wish to know what the FAR will be if the FRR is set to 0 percent. The number that is disposed in the middle is the Equal Error Rate (EER). To address the aspect of movable thresholds, another method of quoting performance is the EER. Referring further to FIG. 2, to find the EER, the threshold 32 is set so that the percentage of FAR equals the percentage of FRR, and the overall error is calculated. For example, if the threshold 32 is set so that 5 percent of valid users 24 are rejected and 5 percent of impostors 30 are accepted, the overall EER is 5 percent. This is the outcomes table of a 5 percent EER.

Another measure of biometrics performance is called Failure to Acquire (FTA) 8, which is the failure of the system to find a signal to analyze. For example, in the fingerprint area, this is known as the 'presentation problem.' If a user does not place the user's finger on the scanner with the right orientation, or if the user moves the user's finger while the system is scanning, the resulting image cannot be processed. Likewise, in a speech system, if the user does not speak loudly enough, or if there is line noise or a bad connection, the system can fail to find the words. In a face verification system, the system may not be able to find a head in the proper frame it expects, and hence fails to acquire the photo. FTA 8 is often a result of human factor problems, mainly due to the amount of training a user may have or the amount of work a user must do to make the biometric work.

A numerical description of the degree of separation of two distributions, such as the scores of the valid users 24 and the scores of the impostors 30, known as "d'," is available from statistical decision and signal detection theory, and is related to the Neyman-Pearson equations describing distributions. It is defined according to the equation:

$$d' = (m2-m1)/\sqrt{[sd1^2 + sd2^2)/2]}$$

in which "d"' is equal to the difference between the means of the distributions divided by the square root of the average of the squares of the standard deviations of the distributions.

Figure 4:
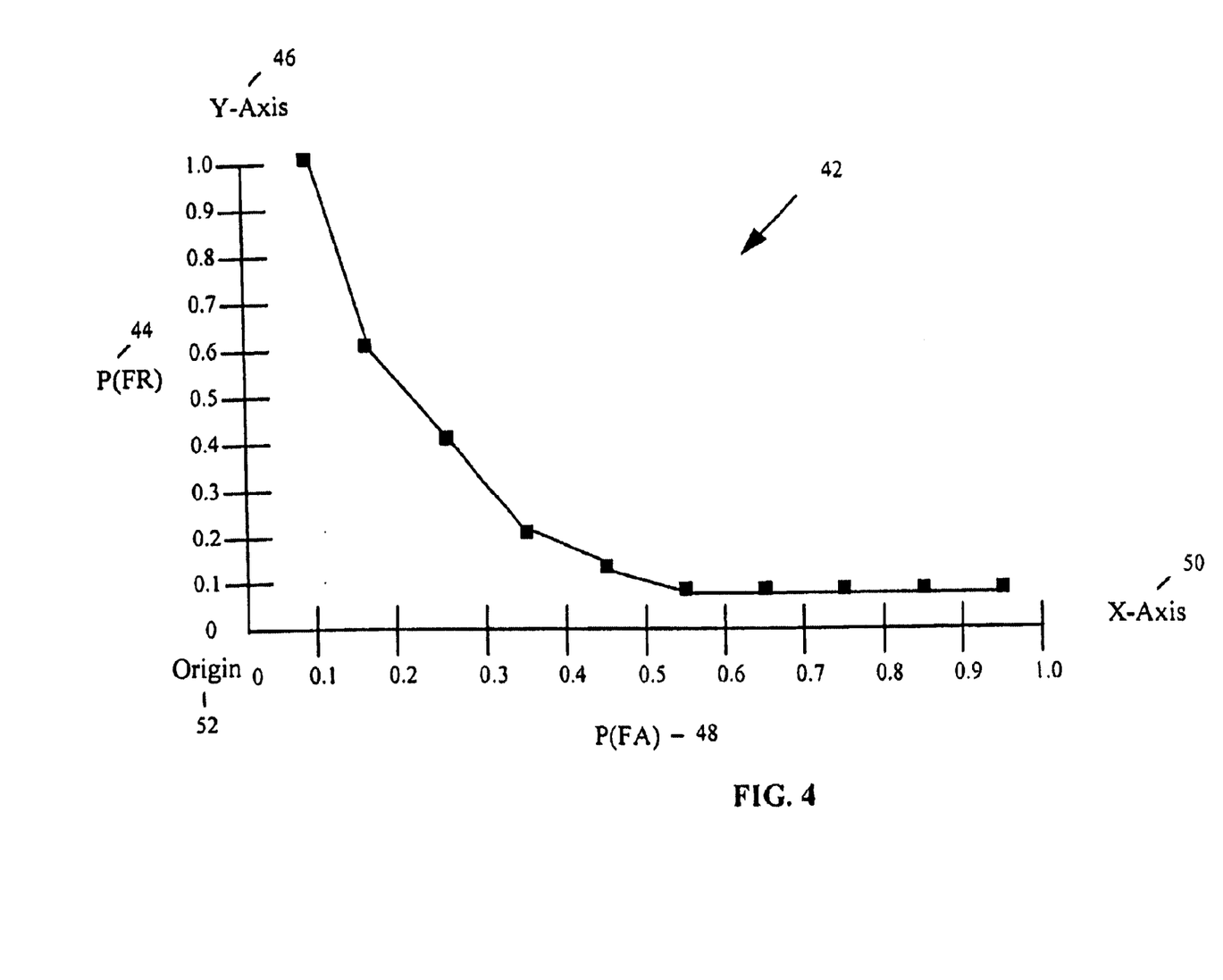
FIG. 4 is a diagram which illustrates an example of a receiver operating characteristic (ROC) curve for an embodiment of the present invention.

FIG. 4 is a diagram which illustrates an example of a receiver operating characteristic (ROC) curve 42 for an embodiment of the present invention. Referring to FIG. 4, the Probability of False Reject or P(FR) 44 is plotted on the y-axis 46, and the Probability of False Acceptance or P(FA)) 48 is plotted on the x-axis 50. As previously mentioned, there is a tradeoff by moving the threshold, for example, higher and rejecting more valid users 23 but also keeping out more impostors 30. This tradeoff is shown as the ROC curve 42. In the ROC curve 42, points near the origin (0, 0) 52 represent operating the biometric with some FA 38 and FR 40, whereas points at the ends of the line represent thresholds which are set very high or very low. For example, the threshold can be set high, such that P(FA) 48 is low and P(FR) 44 is high, or the threshold can be set low, such that P(FA) 48 is high while P(FR) 44 is low.

Figure 5:
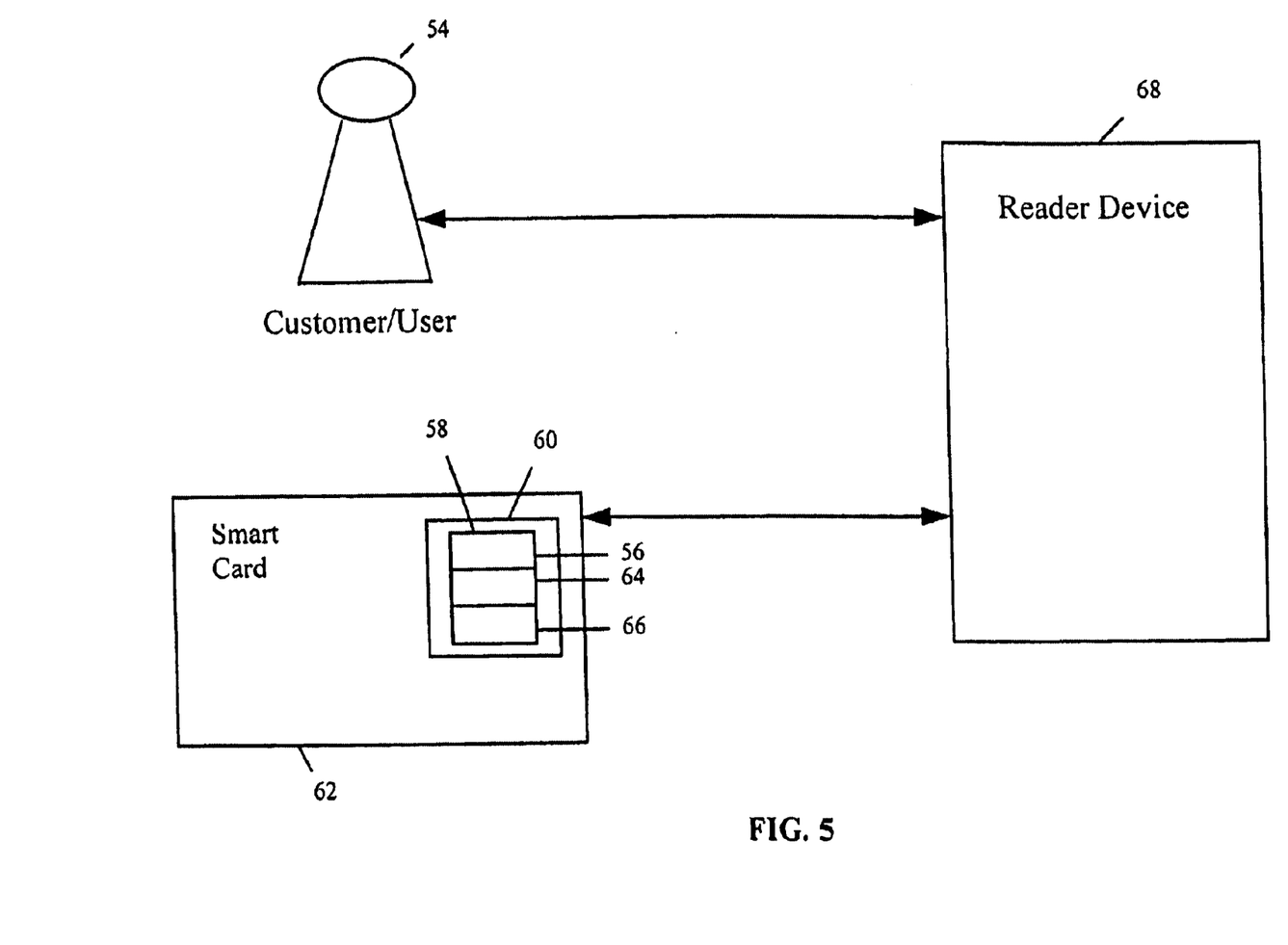
FIG. 5 is a flow chart which shows somewhat schematically an overview of the key components and the flow of information between the key components for an embodiment of the present invention.

FIG. 5 is a flow chart which shows somewhat schematically the key components and the flow of information between the key components for an embodiment of the present invention. Referring to FIG. 5, the system and method for biometric authentication of a smart card user 54 for an embodiment of the present invention involves storing certain information fields 56 in an application 58 on a microprocessor 60 embedded in the smart card 62, along with a biometric sample 64 itself. The information fields 56 include system identification and personal data, as well as a hashed data field, which is decoded by the system during the authentication process to certify the integrity of the information parameters.

Referring further to FIG. 5, additionally, the application 58 on the smart card 62 includes a probability look-up table 66 which quantifies a reader device performance histogram distribution into discrete levels of match score 12 and assigns a corresponding probability factor to each level for both false acceptances of impostors 30 and false rejections of valid users 24. The system reader device 68 is programmed with a desired Probability of False Acceptances or P(FA)'s 48 and False Rejections or P(FR)'s 44. The system reader 68 is also programmed with an instruction routine that tells the system signal processor to look to the probability look-up table 66 on the card 62 to determine the false acceptances or false rejections threshold match score corresponding to the desired probability factor, to be used for authentication.

An embodiment of the present invention provides an architecture which allows flexibility in application design. Since application requirements vary in terms of risk, user populations, channel properties and cost, the system and method for an embodiment of the present invention supports a wide range of these properties. Biometric technology provides a type of security that is qualitatively different from that provided by token-based methods and information based methods. Token based methods make use of something that a user has, such as the card itself, and information-based methods utilize something that the user knows, such as a PIN or password. Biometric technology for an embodiment of the present invention can be used in addition to these other methods or by itself.

In embodiments of the present invention, the use of biometric technology in conjunction with the smart card 62 makes the card application 58 more secure, thereby reducing the risk of fraudulent or unauthorized use. This allows for the implementation of higher-valued applications. Further, such use of biometric technology provides for non-repudiation of a transaction by the user 54 using the user's smart card 62, so the user cannot deny a transaction performed by the user with the smart card. In other words, use of biometric technology in conjunction with the smart card 62 undeniably ties the user 54 to use of the smart card by the user. In addition, by putting the biometric template 64 on the card 62, application design requirements are simplified, since network traffic is eliminated or greatly reduced. This also enhances security and privacy, since it is unnecessary to transmit the template 64 around to different locations where it is needed.

The system and method for an embodiment of the present invention has numerous applications, such as secure area access, computer network and computer access, stored value or other monetary access, PBX and long distance access. Each of such applications has different requirements in terms of risk, environment, user, channel and cost. In terms of risk, a transaction which, for example, transfers a million dollars to a numbered Swiss bank account has a higher risk than one which simply returns a user's bank account balance. Gaining access, for example, to a nuclear weapons facility or to war plans or lists of secret agents carries a greater risk than gaining access to an officer's club or DISNEY WORLD. An objective of the application designer is to set application operating thresholds as tightly or as loosely as is appropriate for the particular risk involved.

In terms of environment, an office environment is different, for example, from an outdoor setting in a public space or a freezing border crossing station. While a face verification system works well, for example, in an office environment, it may not work in a public space where the lighting and background is uncontrolled. Likewise, a hand geometry unit will not work well at the freezing border station, unless heated in some way, but a speaker verification system may work. In regard to the user, if a user uses a particular system frequently, the user soon becomes habituated to the system. Since human factors are an important part of overall system performance, a habituated user typically obtains better system performance than an unhabituated user on any given biometric. Some biometric methods are easier to learn and faster to use than others, so the type of user that is anticipated is an important factor in the selection and deployment of a biometric.

In terms of channel, some biometrics are more appropriate than others, depending on the channel of use. For example, for long distance or cell phone access, speaker verification is more natural and efficient than, for example, fingerprinting. Secure area access method choice depends on the environment, but signature verification may be more difficult than a camera based method, given the fact that the user may be carrying packages or the like and standing, or the user may be in a wheelchair. However, for a point of sale terminal, if a signature is required in a credit card transaction anyway, and if the merchant is moving to a paper-less business and the terminal has a pressure sensitive tablet for signature capture, then signature verification may be the most appropriate biometric method.

Other channels include, for example, the personal computer (PC) at home. Since many people only have one phone line into their home, deploying voice authentication may be cumbersome. However, a less cumbersome method may be a camera based method, since people may have cameras for other purposes, such as video teleconferencing. Other channels include, for example, laptop, personal digital assistant (PDA), public internet terminals, automated teller machines (ATM's), vehicles, and the like.

In terms of cost, there are a number of determinants of cost of a biometric, including the cost of enrollment, such as workstations, user time and monitoring, if supervised. Other cost factors include, for example, the cost of an access trial, such as user time, hardware and software and operations costs amortized over the number of verifications in the expected duration of the system, and the cost of storing the templates, such as the size of the template divided by cost of storage. To illustrate an example of the range of costs, a speaker verification system can be deployed for a telephone network that costs approximately $5,000 per channel for a processor capable of performing up to 5 verifications a minute. If the system performs 300 verifications an hour, 24 hours a day, 7 days a week, 360 days a year, after 3 years when the system is presumed obsolete, the cost per verification is about 6 cents per hundred verifications.

On the other hand, to illustrate another example of the range of costs, an iris scanner at a secure room portal might also cost about $5,000, but traffic through the portal might only be 30 verifications an hour or less, so the cost per verification for the iris scanner is proportionally greater than for speaker verification. As for template size, a hand geometry unit requires only 9 bytes of storage per template, whereas some fingerprint units and voice units require upwards of a kilobyte per template. Since memory costs on smart cards are not inexpensive, and the amount of time it takes to transfer the data off the card, in the case of matching template to signal off the card, is proportional to the size of the template, template size is an important consideration.

Figure 6:
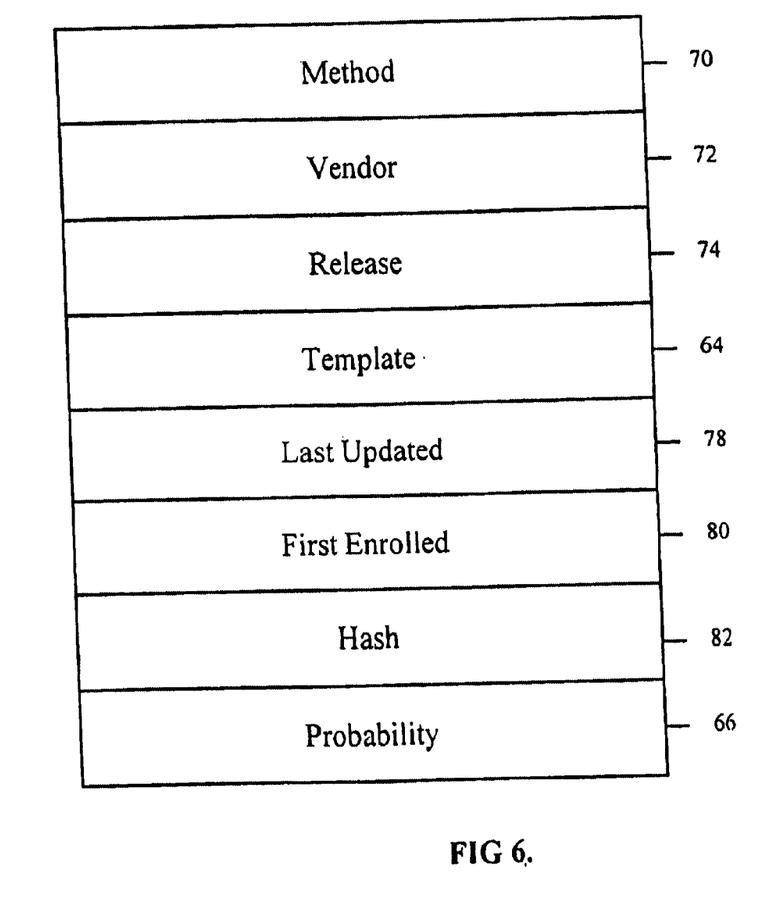
FIG. 6 is a table which illustrates examples of the type of data stored on the smart card for an embodiment of the present invention.

In an embodiment of the present invention, a smart card parameter protocol mandates that certain information fields 56 are stored on the card 62, in addition to the biometric sample 64 itself. These information fields 56 include system identification and personal data, as well as a hashed data field, which is decoded by the system during the authentication process to certify the integrity of the information parameters. FIG. 6 is a table which illustrates examples of the type of data stored on the smart card 62 for an embodiment of the present invention.

Referring to FIG. 6, the content of the first six fields includes, for example, method 70, vendor 72, release 74, template 64, last updated 78, and first enrolled 80. The method field 70 relates to the biometric technology employed, such as fingerprint. The vendor field 72 identifies the particular vendor, such as SONY. The release field 74 specifies a release number, such as 1.0. The template field 64 is the particular template, and the last updated and first enrolled fields 78, 80 indicate dates. Referring further to FIG. 6, the hash value 82 is a value which is arrived at by hashing everything in the record. This can be transmitted elsewhere to authenticate the validity of the template 64.

Figure 7:
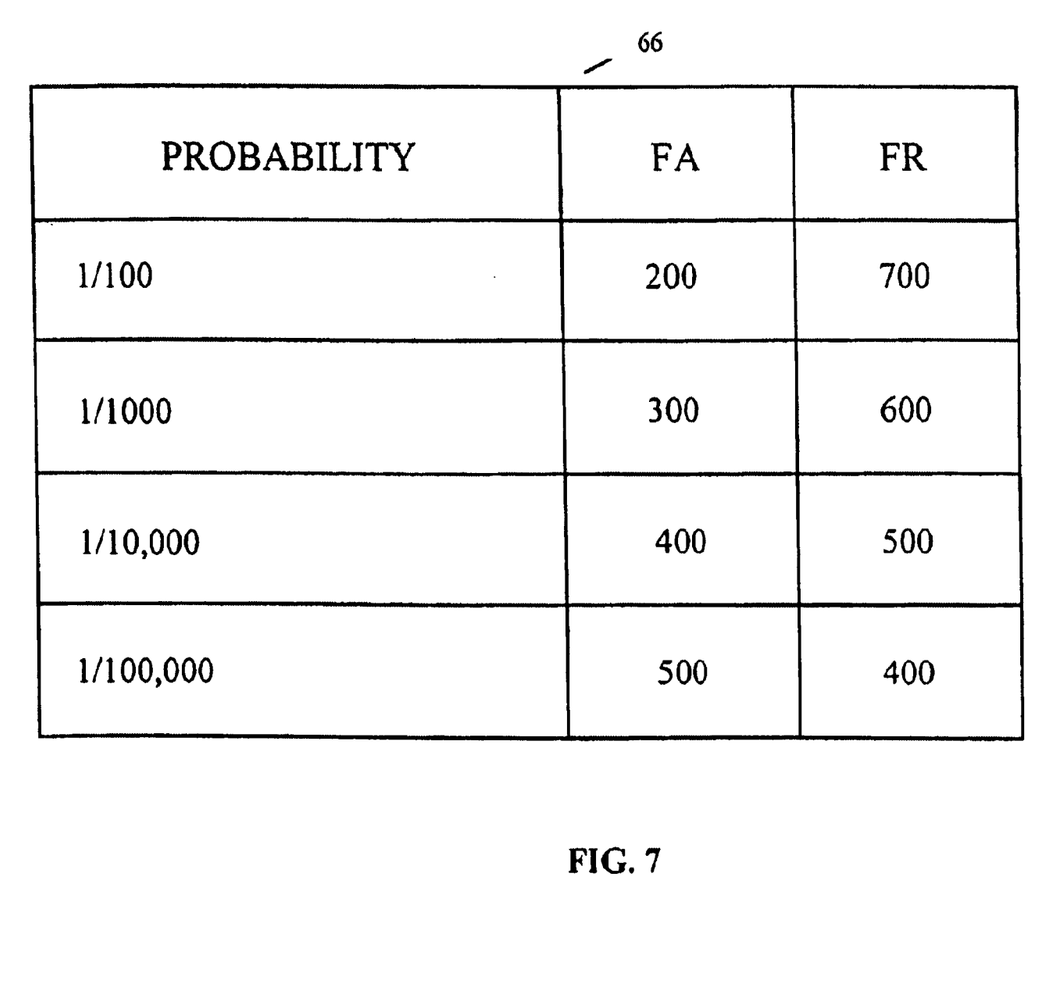
FIG. 7 is a table which shows a sample probability look-up table for an embodiment of the present invention.

Another aspect of an embodiment of the present invention is that the card 62 also includes a probability look-up table 66 which quantifies the reader device performance histogram distribution into discrete levels of match score, such as 200, 300, 400, and so on, and assigns a corresponding probability factor to each level. FIG. 7 is a table which shows a sample probability look-up table 66 for an embodiment of the present invention. Referring to FIG. 7, the probability look-up table 66 includes an array of threshold values that are interpreted by the application 58. For example, for a False Accept Rate or FAR of less than 1 in 100, the match value between the template 64 and the presented signal must be greater than 200. Alternatively, for a False Reject Rate or FRR of less than 1 in one million, a threshold value of 400 is used. This is done for both FA 38 and FR 40.

In an embodiment of the present invention, the system reader 68 is programmed with a desired P(FA) 48 or P(FR) 44 rather than with a fixed threshold value. The system reader 68 is also programmed with an instruction routine that tells the system signal processor to look to the probability look-up table 66 on the card 62 to determine the desired probability factor's corresponding FA 38 or FR 40 threshold match score to be used for authentication. This aspect reduces the cost of new system releases, since the application software may remain the same and only the cards have to be re-programmed, instead of both the system and the cards as in the prior art. In addition, the cards may be programmed for personalized authentication, for example, at either a higher or lower security level, on an individual basis, instead of one value fits all.

Figure 8:
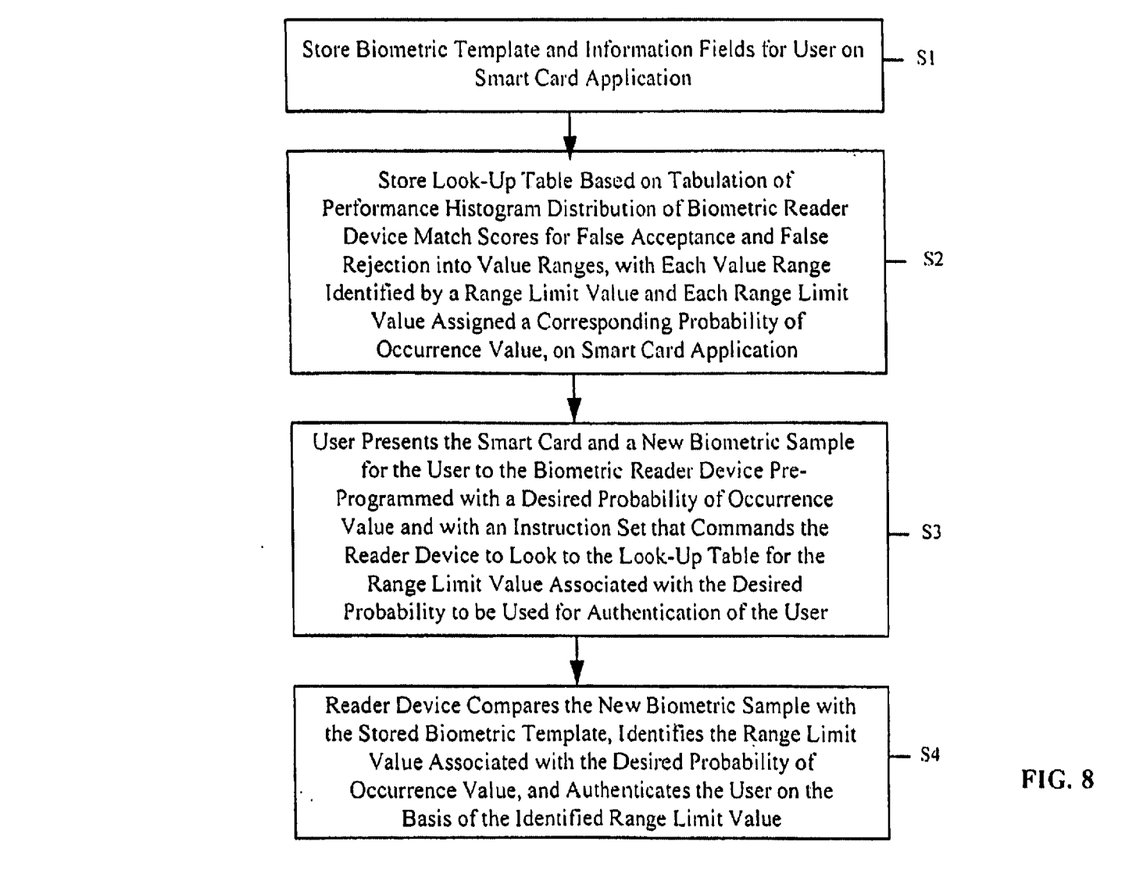
FIG. 8 is a flow chart which provides further detail regarding the process of authenticating a user through match scoring of a sample biometric obtained from the user by a biometric reader device for an embodiment of the present invention.

In an embodiment of the present invention, the user 54 is authenticated through match scoring of a sample biometric obtained from the user by the biometric reader device 68. FIG. 8 is a flow chart which provides further detail regarding the process of authenticating a user through match scoring of a sample biometric obtained from the user by a biometric reader device for an embodiment of the present invention. At S1, a biometric template 64 for the user 54 is stored in an application 58 on a microprocessor 60 of the smart card 62, along with information fields 56, including system identification and personal data for the user. At S2, a look-up table 66 based on a tabulation of performance histogram distribution of biometric reader device match scores for false acceptance or FA 38 and false rejection or FR 40 into value ranges, with each value range identified by a range limit value and each range limit value assigned a corresponding probability of occurrence value P(FA) 48 and P(FR) 44, is also stored on the smart card application 58.

Referring further to FIG. 8, at S3, the user 54 presents the smart card 58, along with a new biometric sample for the user, to the biometric reader device 68 pre-programmed with a desired probability of occurrence value and with an instruction set that commands the reader device to look to the look-up table 66 on the card 58 for the range limit value associated with the desired probability to be used for authentication of the user. At S4, the reader device 58 compares the new biometric sample for the user 54 with the user's biometric template 64 stored on the smart card 62, identifies the range limit value associated with the desired probability of occurrence value, and authenticates the user on the basis of the identified range limit value.

It is clear that there is no 'one biometric fits all' for every application, nor is there one operating threshold that is appropriate for all applications. An embodiment of the present invention provides a flexible architecture format for storing biometrics on smart cards that is independent of application or biometric methodology or vendor. In an embodiment of the present invention, threshold values are no longer 'hardwired' in a specific application to a specific method, vendor and specific release. The same architecture applies no matter what the risk, vendor, biometric method or release. Thresholds and methods are determined, and probability density functions of various vendors, methods and releases are derived in order to fill in the threshold values. Thus, an embodiment of the present invention supports different methods, vendors and releases, and allows for flexibility in application deployment.

Various preferred embodiments of the present invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is limited only by the following claims.

What is claimed is:

1. A method of authenticating a smart card user at a reader device, comprising:

storing information fields for the user on the smart card, wherein the information fields comprise biometric information for the user and a table of pre-defined probability of occurrence values and corresponding threshold match scores for user authentication;

programming the reader device with: (a) a desired probability of occurrence value and (b) an instruction set directing the reader device to look to the table stored on the smart card to obtain the threshold match score that corresponds to the desired probability of occurrence value;

presenting the smart card and a biometric sample for the user to the reader device;

calculating a match level between: (a) the biometric information for the user that is stored on the smart card and (b) the biometric sample for the user that is presented to the reader device;

comparing the calculated match level with the threshold match score that is obtained from the table stored on the smart card; and automatically authenticating the user based at least in part on the match level between the stored biometric information and the presented biometric sample, wherein the user is authenticated if the calculated match level is greater than the threshold match score that is obtained from the table stored on the smart card.

2. The method of claim 1, wherein storing information fields for the user further comprises storing a biometric template for the user.

3. The method of claim 2, wherein storing the biometric template further comprises storing at least one model of biometric patterns for the user, wherein the at least one model of biometric patterns comprises at least one of the following: voice print, photograph, signature, fingerprint, hand geometry, retinal image, and iris scan.

4. The method of claim 1, wherein storing the information fields relating to the table of pre-defined probability of occurrence values for user authentication further comprises automatically assigning a probability of occurrence value to each of a plurality of pre-defined range limit values.

5. The method of claim 4, wherein automatically assigning the probability of occurrence values further comprises automatically identifying the range limit values for each of a plurality of value ranges of biometric reader device match scores.

6. The method of claim 5, wherein automatically identifying the range limit values further comprises automatically tabulating a performance histogram distribution of biometric reader device match scores for false acceptance of an impostor and false rejection of a valid user into the plurality of value ranges.

7. The method of claim 6, wherein automatically tabulating the performance histogram distribution further comprises automatically quantifying the performance histogram distribution into discrete levels of the biometric reader device match scores.

8. The method of claim 7, wherein automatically tabulating the performance histogram distribution further comprises automatically assigning the probability of occurrence value for each of the discrete levels of the biometric reader device match scores.

9. The method of claim 1, wherein storing the information fields further comprises storing personal data for the user on the smart card.

10. The method of claim 1, wherein storing information fields further comprises storing information related to identification of a biometric system on the smart card.

11. The method of claim 1, wherein storing the information fields further comprises storing a hashed data field on the smart card.

12. The method of claim 1, wherein storing the information fields further comprises storing the information fields in an application on the smart card.

13. The method of claim 12, wherein storing the information fields in the application further comprises storing the information fields in an application on a microprocessor of the smart card.

14. The method of claim 1, wherein presenting the smart card further comprises presenting the smart card to the reader device associated with a terminal.

15. The method of claim 14, wherein the terminal further comprises at least one of an area access terminal, a computer network terminal, a computer access terminal, a stored value terminal, a monetary access terminal, a PBX terminal, a long distance terminal, a personal computer, a laptop computer, a personal digital assistant, a public internet terminal, and an automated teller machine.

16. The method of claim 1, wherein presenting the biometric sample further comprises presenting the biometric sample to the reader device associated with a terminal.

17. The method of claim 16, wherein the terminal further comprises at least one of an area access terminal, a computer network terminal, a computer access terminal, a stored value terminal, a monetary access terminal, a PBX terminal, a long distance terminal, a personal computer, a laptop computer, a personal digital assistant, a public internet terminal, and an automated teller machine.

18. The method of claim 1, wherein presenting the biometric sample further comprises presenting at least one biometric sample, wherein the at least one biometric sample comprises at least one of: voice print, photograph, signature, fingerprint, hand geometry, retinal image, and iris scan.

19. The method of claim 1, wherein programming the reader device further comprises programming the reader device with the desired probability of occurrence value for false acceptance of an impostor and false rejection of a valid user.

20. The method of claim 19, wherein programming the reader device further comprises programming the reader device with the instruction set directing the reader device to look to the stored table of probability of occurrence values for a false acceptance of an impostor and false rejection of a valid user threshold match score corresponding to the desired probability of occurrence value.

21. The method of claim 1, wherein automatically authenticating further comprises automatically authenticating the user by an application associated with the reader device.

22. The method of claim 21, wherein automatically authenticating further comprises automatically authenticating the user by an application residing at least in part on the reader device.

23. The method of claim 21, wherein automatically authenticating further comprises automatically authenticating the user by an application residing at least in part on a terminal associated with the reader device.

24. The method of claim 1, wherein automatically authenticating further comprises automatically authenticating the user by an application associated with the smart card.

25. The method of claim 24, wherein automatically authenticating further comprises automatically authenticating the user by an application residing at least in part on the smart card.

26. The method of claim 1, wherein programming the reader device further comprises programming the reader device with the probability of occurrence value for false rejection of a valid user.

27. A system for authenticating a smart card user at a reader device, comprising:

means for storing information fields for the user on the smart card, wherein the information fields comprise biometric information for the user and a table of pre-defined probability of occurrence values and corresponding threshold match scores for user authentication;

means for programming the reader device with: (a) a desired probability of occurrence value and (b) an instruction set directing the reader device to look to the table stored on the smart card to obtain the threshold match score corresponding to the desired probability of occurrence value;

means for presenting the smart card and a biometric sample for the user to the reader device;

means for calculating a match level between: (a) the biometric information for the user that is stored on the smart card and (b) the biometric sample for the user that is presented to the reader device;

means for comparing the calculated match level with the threshold match score that is obtained from the table stored on the smart card; and means for automatically authenticating the user based at least in part on the match level between the stored biometric information and the presented biometric sample, wherein the user is authenticated if the calculated match level is greater than the threshold match score that is obtained from the table stored on the smart card.

28. The system of claim 27, wherein the means for storing the information fields further comprises an application on the smart card.

29. The system of claim 28, wherein the application on the smart card further comprises an application on a microprocessor of the smart card.

30. The system of claim 29, wherein the means for presenting the smart card and the biometric sample further comprises a reader device associated with a terminal.

31. The system of claim 30, wherein the means for presenting the smart card and the biometric sample further comprises an application associated with the reader device.

32. The system of claim 31, wherein the terminal further comprises at least one of an area access terminal, a computer network terminal, a computer access terminal, a stored value terminal, a monetary access terminal, a PBX terminal, a long distance terminal, a personal computer, a laptop computer, a personal digital assistant, a public internet terminal, and an automated teller machine.

33. The system of claim 27, wherein the means for automatically authenticating the user further comprises an application associated with the reader device.

34. The system of claim 33, wherein the reader device is associated with a terminal.

35. The system of claim 34, wherein the terminal further comprises at least one of an area access terminal, a computer network terminal, a computer access terminal, a stored value terminal, a monetary access terminal, a computer access terminal, a stored value terminal, a monetary access terminal, a PBX terminal, a long distance terminal, a personal computer, a laptop computer, a personal digital assistant, a public internet terminal and an automated teller machine.

36. The system of claim 27, wherein the means for automatically authenticating further comprises an application associated with the smart card.

37. A method of authenticating a smart card user at a reader device, comprising:

storing information on the smart card, wherein the information comprises at least a biometric template for the user and a probability look-up table which quantifies a reader device performance histogram into discrete levels of match scores and corresponding probability of occurrence values;

programming the reader device with a desired probability of occurrence value based on the degree of risk that will be tolerated for a transaction and an instruction routine that directs the reader device to look to the stored probability look-up table on the smart card to determine a threshold match score corresponding to the desired probability of occurrence value;

comparing the biometric template stored on the smart card with a biometric sample received from a user at the reader device;

automatically adjusting the threshold match score that corresponds to the desired probability of occurrence value; and authenticating the user if the comparison yields a match score at least as great as the adjusted threshold match score corresponding to the desired probability of occurrence value.

38. A system for authenticating a smart card user at a reader device, comprising:

a smart card microprocessor storing information comprising a biometric template for the user and a probability look-up table which quantifies a reader device performance histogram into discrete levels of match scores and corresponding probability of occurrence values;

a reader device for receiving the smart card and programmed with a desired probability of occurrence value based on the degree of risk that will be tolerated for a transaction and an instruction routine that directs the reader device to look to the stored probability look-up table on the smart card to determine a threshold match score corresponding to the desired probability of occurrence value; and an application associated with at least one of the smart card microprocessor and the reader device, wherein the application is programmed to: (a) automatically adjust the threshold match score that corresponds to the desired probability of occurrence value, (b) compare the biometric template stored on the smart card microprocessor with a biometric sample received from the user, and (c) authenticate the user if the comparison yields a match score at least as great as the adjusted threshold match score corresponding to the desired probability, of occurrence value.

* * * * *